(12) United States Patent
Chang

(10) Patent No.: US 10,563,865 B2
(45) Date of Patent: Feb. 18, 2020

(54) GAS TURBINE ENGINE WITH CERAMIC PANEL

(71) Applicant: United Technologies Corporation, Farmington, CT (US)

(72) Inventor: Hoyt Y. Chang, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 568 days.

(21) Appl. No.: 14/903,482

(22) PCT Filed: Jun. 17, 2014

(86) PCT No.: PCT/US2014/042740
§ 371 (c)(1),
(2) Date: Jan. 7, 2016

(87) PCT Pub. No.: WO2015/009384
PCT Pub. Date: Jan. 22, 2015

(65) Prior Publication Data
US 2016/0161121 A1 Jun. 9, 2016

Related U.S. Application Data

(60) Provisional application No. 61/846,667, filed on Jul. 16, 2013.

(51) Int. Cl.
*F23R 3/60* (2006.01)
*F23R 3/00* (2006.01)
(Continued)

(52) U.S. Cl.
CPC ............ *F23R 3/002* (2013.01); *C04B 35/80* (2013.01); *F01D 25/145* (2013.01); *F01D 25/30* (2013.01);
(Continued)

(58) Field of Classification Search
CPC .. F23R 3/60; F23R 3/007; F23R 3/002; B23P 15/008
(Continued)

(56) References Cited

U.S. PATENT DOCUMENTS 4,512,699 A * 4/1985 Jackson .................. F16B 5/02
403/28
4,728,257 A * 3/1988 Handschuh ............ F01D 11/24
415/136
(Continued)

FOREIGN PATENT DOCUMENTS

EP 2853816 4/2015

OTHER PUBLICATIONS

Extended European Search Report for European Application No. 14826793.3 dated Feb. 3, 2017.
(Continued)

*Primary Examiner* — Gerald L Sung
(74) *Attorney, Agent, or Firm* — Carlson, Gaskey & Olds, P.C.

(57) ABSTRACT

A gas turbine engine ceramic panel assembly includes a ceramic liner that has a slot and includes a hole. An insert is received in the slot and provides a female fastening element aligned with the hole. A method of manufacturing a ceramic panel assembly includes the steps of forming a ceramic liner with a slot, installing an insert into the slot, and securing the ceramic liner to a structure using a fastening assembly.

11 Claims, 3 Drawing Sheets

(51) Int. Cl.
F02K 1/82 (2006.01)
F01D 25/14 (2006.01)
F01D 25/30 (2006.01)
C04B 35/80 (2006.01)
F02C 7/24 (2006.01)
F02K 1/80 (2006.01)
F02K 1/78 (2006.01)

(52) U.S. Cl.
CPC .............. F02C 7/24 (2013.01); F02K 1/80 (2013.01); F02K 1/822 (2013.01); F23R 3/007 (2013.01); F23R 3/60 (2013.01); F02K 1/78 (2013.01); F05D 2220/32 (2013.01); F05D 2230/10 (2013.01); F05D 2230/60 (2013.01); F05D 2240/128 (2013.01); F05D 2240/35 (2013.01); F05D 2260/231 (2013.01); F05D 2260/30 (2013.01); F05D 2300/5023 (2013.01); F05D 2300/6033 (2013.01); F23R 2900/00017 (2013.01); Y02T 50/672 (2013.01); Y02T 50/675 (2013.01)

(58) Field of Classification Search
USPC .................................................. 60/753, 755
See application file for complete search history.

(56) References Cited

U.S. PATENT DOCUMENTS

| 4,820,097 | A | * | 4/1989 | Maeda | F02K 1/80 |
| | | | | | 165/134.1 |
| 5,069,034 | A | | 12/1991 | Jourdain et al. | |
| 5,333,443 | A | * | 8/1994 | Halila | F23R 3/002 |
| | | | | | 60/752 |
| 5,624,256 | A | * | 4/1997 | Pfeiffer | F23M 5/04 |
| | | | | | 110/336 |
| 6,711,900 | B1 | * | 3/2004 | Patel | F23R 3/06 |
| | | | | | 60/752 |
| 7,153,054 | B2 | | 12/2006 | Arbona | |
| 7,178,325 | B2 | | 2/2007 | Arbona | |
| 7,908,867 | B2 | | 3/2011 | Keller et al. | |
| 7,967,562 | B2 | | 6/2011 | Frost et al. | |
| 7,988,395 | B2 | | 8/2011 | Steffier | |
| 8,141,370 | B2 | | 3/2012 | Bulman et al. | |
| 8,322,983 | B2 | | 12/2012 | Marini | |
| 9,683,743 | B2 | * | 6/2017 | Clemen | F23R 3/00 |
| 9,765,698 | B2 | * | 9/2017 | Bennett | F02C 7/28 |
| 9,810,154 | B2 | * | 11/2017 | Rauch | F02C 7/24 |
| 9,874,104 | B2 | * | 1/2018 | Shapiro | F01D 11/08 |
| 2002/0184892 | A1 | * | 12/2002 | Calvez | F23R 3/007 |
| | | | | | 60/796 |
| 2003/0123953 | A1 | * | 7/2003 | Razzell | F01D 25/243 |
| | | | | | 411/419 |
| 2003/0133790 | A1 | * | 7/2003 | Darkins, Jr. | F01D 9/04 |
| | | | | | 415/139 |
| 2004/0120808 | A1 | * | 6/2004 | Alford | F01D 9/04 |
| | | | | | 415/173.1 |
| 2007/0031258 | A1 | * | 2/2007 | Campbell | F01D 9/04 |
| | | | | | 416/189 |
| 2008/0206046 | A1 | * | 8/2008 | Razzell | F01D 11/005 |
| | | | | | 415/173.1 |
| 2009/0193810 | A1 | * | 8/2009 | Gerendas | F23R 3/002 |
| | | | | | 60/753 |
| 2009/0193813 | A1 | * | 8/2009 | Garry | F23M 5/04 |
| | | | | | 60/796 |
| 2010/0205930 | A1 | | 8/2010 | Conete et al. | |
| 2010/0251721 | A1 | * | 10/2010 | Morrison | F01D 5/147 |
| | | | | | 60/753 |
| 2011/0030378 | A1 | * | 2/2011 | Carlisle | F23R 3/002 |
| | | | | | 60/753 |
| 2011/0123323 | A1 | * | 5/2011 | Ruberte Sanchez | F01D 25/00 |
| | | | | | 415/200 |
| 2011/0293410 | A1 | * | 12/2011 | Marusko | F01D 9/04 |
| | | | | | 415/173.1 |
| 2011/0318171 | A1 | * | 12/2011 | Albers | F01D 11/125 |
| | | | | | 415/173.1 |
| 2012/0082540 | A1 | * | 4/2012 | Dziech | F01D 11/005 |
| | | | | | 415/173.1 |
| 2012/0107122 | A1 | * | 5/2012 | Albers | F01D 11/005 |
| | | | | | 416/179 |
| 2012/0171023 | A1 | * | 7/2012 | Albers | F01D 25/243 |
| | | | | | 415/173.1 |
| 2012/0171027 | A1 | * | 7/2012 | Albers | F01D 11/005 |
| | | | | | 415/208.1 |
| 2013/0019603 | A1 | * | 1/2013 | Dierberger | F23R 3/002 |
| | | | | | 60/772 |
| 2013/0156550 | A1 | * | 6/2013 | Franks | F01D 11/08 |
| | | | | | 415/126 |
| 2013/0156556 | A1 | * | 6/2013 | Franks | F01D 25/246 |
| | | | | | 415/182.1 |
| 2014/0023490 | A1 | * | 1/2014 | Hillier | F01D 11/005 |
| | | | | | 415/173.6 |
| 2014/0130501 | A1 | * | 5/2014 | Clemen | F23R 3/00 |
| | | | | | 60/722 |
| 2014/0255172 | A1 | * | 9/2014 | Ruberte Sanchez | F23R 3/002 |
| | | | | | 415/177 |
| 2014/0260320 | A1 | * | 9/2014 | Graves | F02C 7/20 |
| | | | | | 60/796 |
| 2014/0352323 | A1 | * | 12/2014 | Bennett | F02C 7/28 |
| | | | | | 60/799 |
| 2015/0082798 | A1 | * | 3/2015 | Hucker | F01D 25/145 |
| | | | | | 60/753 |
| 2015/0128602 | A1 | * | 5/2015 | Clemen | F23R 3/002 |
| | | | | | 60/754 |
| 2015/0260400 | A1 | * | 9/2015 | Clemen | F23R 3/002 |
| | | | | | 60/722 |
| 2015/0322890 | A1 | * | 11/2015 | Lu | F02K 1/80 |
| | | | | | 60/770 |
| 2016/0003103 | A1 | * | 1/2016 | Shapiro | F01D 25/246 |
| | | | | | 416/185 |
| 2016/0025345 | A1 | * | 1/2016 | Chandler | F23R 3/10 |
| | | | | | 60/754 |
| 2016/0047549 | A1 | * | 2/2016 | Landwehr | F23R 3/007 |
| | | | | | 60/753 |
| 2016/0084101 | A1 | * | 3/2016 | McCaffrey | F01D 5/225 |
| | | | | | 415/173.3 |
| 2016/0097303 | A1 | * | 4/2016 | Baldiga | F01D 11/08 |
| | | | | | 416/182 |
| 2016/0102860 | A1 | * | 4/2016 | Chandler | F23R 3/002 |
| | | | | | 60/754 |
| 2016/0201910 | A1 | * | 7/2016 | Chang | F01D 11/08 |
| | | | | | 60/753 |
| 2016/0238251 | A1 | * | 8/2016 | Chang | F23R 3/007 |
| 2016/0312639 | A1 | * | 10/2016 | Shapiro | F01D 9/04 |
| 2016/0376901 | A1 | * | 12/2016 | O'Leary | F01D 11/005 |
| | | | | | 415/116 |
| 2016/0376906 | A1 | * | 12/2016 | O'Leary | F01D 11/10 |
| | | | | | 415/173.1 |
| 2016/0376907 | A1 | * | 12/2016 | O'Leary | F01D 11/12 |
| | | | | | 415/173.3 |
| 2016/0376921 | A1 | * | 12/2016 | O'Leary | F01D 25/12 |
| | | | | | 415/116 |
| 2017/0002674 | A1 | * | 1/2017 | Vetters | F01D 25/246 |
| 2017/0037740 | A1 | * | 2/2017 | O'Leary | F01D 9/02 |
| 2017/0101882 | A1 | * | 4/2017 | Sippel | F01D 11/08 |
| 2017/0138597 | A1 | * | 5/2017 | Freeman | F23R 3/007 |
| 2017/0260869 | A1 | * | 9/2017 | Vetters | F01D 11/08 |
| 2017/0268359 | A1 | * | 9/2017 | Frey | F01D 11/02 |
| 2017/0298753 | A1 | * | 10/2017 | O'Leary | F01D 11/08 |
| 2018/0080655 | A1 | * | 3/2018 | Heinze | F23R 3/60 |
| 2018/0149030 | A1 | * | 5/2018 | Freeman | F01D 9/04 |
| 2018/0149031 | A1 | * | 5/2018 | Sippel | F01D 11/005 |
| 2018/0149041 | A1 | * | 5/2018 | Freeman | F01D 11/08 |
| 2018/0319922 | A1 | * | 11/2018 | Burckhardt | C08G 18/4825 |
| 2018/0371930 | A1 | * | 12/2018 | Sippel | F01D 11/08 |

OTHER PUBLICATIONS

International Search Report for PCT/US2014/042740 dated Oct. 8, 2014.

(56) References Cited

OTHER PUBLICATIONS

International Preliminary Report on Patentability for PCT Application No. PCT/US2014/042740, dated Jan. 28, 2016.

\* cited by examiner

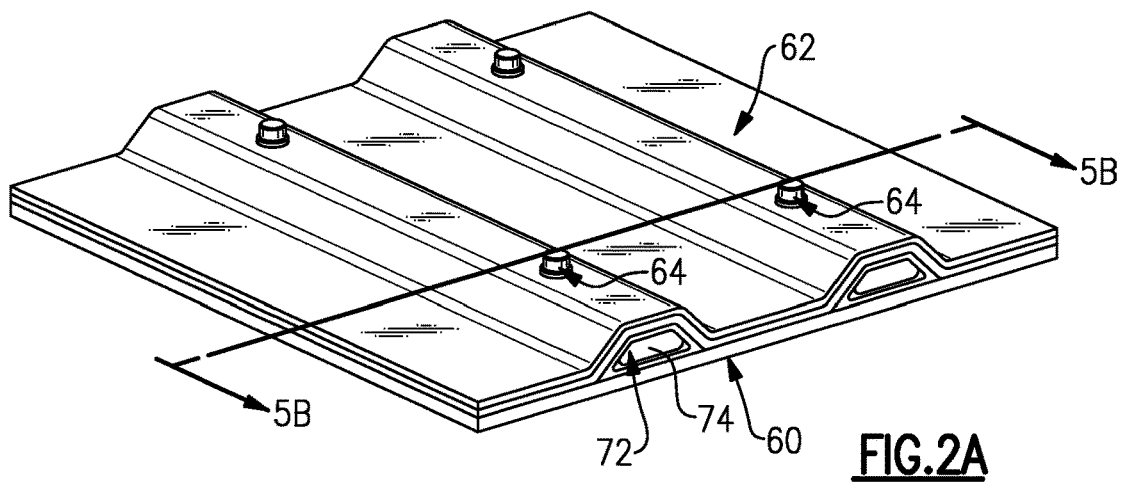
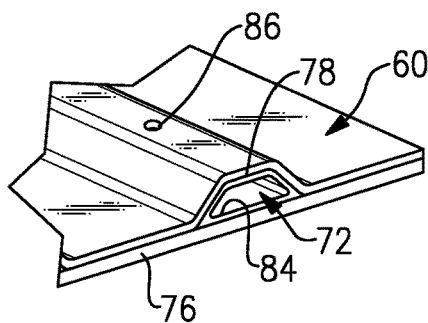
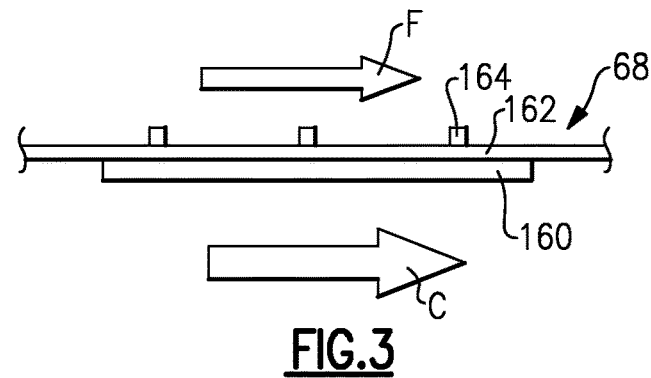
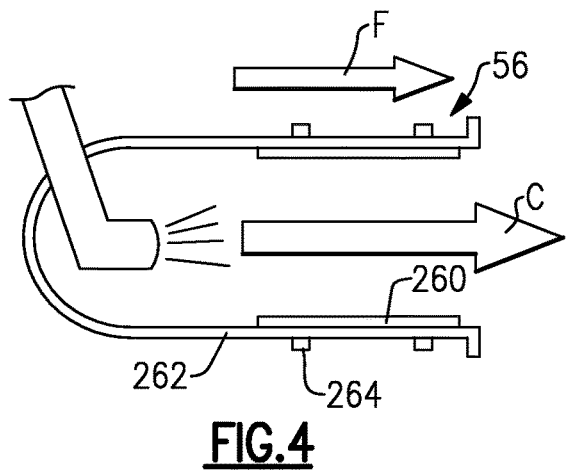

GAS TURBINE ENGINE WITH CERAMIC PANEL

CROSS-REFERENCE TO RELATED APPLICATIONS

This application claims priority to U.S. Provisional Application No. 61/846,667, which was filed on Jul. 16, 2013.

BACKGROUND

This disclosure relates to a gas turbine engine component for high temperature use. More particularly, the disclosure relates to a gas turbine engine ceramic panel and an attachment configuration for securing the ceramic panel to an adjoining structure.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Gas turbine engines produce extremely hot gases. Engines may be made more efficient by increasing the temperatures at which an engine operates. Gas temperatures within the engine are limited so as to not exceed the capabilities of the engine component materials.

Exotic metallic alloys cannot withstand some of the extreme temperatures within the engine. To this end, ceramic-based materials, such as ceramic matrix composites (CMC), are used within the gas turbine engine gas flow path to enable higher temperatures within the gas turbine engine and improve engine operating efficiency. Typically, ceramic panels are secured to adjacent metallic structures. It is difficult to attach the dissimilar materials of the ceramic panels and the metallic support structure due to the different rates of thermal expansion. Ceramic panels are relatively low strength compared to metals, such that typical attachment configurations cannot be used. Typical attachment configurations may use expensively formed features or may still provide weakened areas in the ceramic that may crack.

SUMMARY

In one exemplary embodiment, a gas turbine engine ceramic panel assembly includes a ceramic liner that has a slot and includes a hole. An insert is received in the slot and provides a female fastening element aligned with the hole.

In a further embodiment of any of the above, the ceramic liner is constructed from CMC.

In a further embodiment of any of the above, the ceramic liner is provided by laminated CMC layers. The layers arranged about the slot.

In a further embodiment of any of the above, a threaded bushing is secured to the insert to provide the female fastening element.

In a further embodiment of any of the above, an anti-rotation feature is provided between the bushing and the insert.

In a further embodiment of any of the above, the insert is a metallic material. A threaded hole in the insert provides the female fastening element.

In a further embodiment of any of the above, the insert is slidably received within the slot.

In a further embodiment of any of the above, the slot forms a rib in the ceramic liner.

In a further embodiment of any of the above, there is a structure. The male fastening element secures the ceramic liner to the structure. The ceramic liner circumscribes the male fastening element.

In a further embodiment of any of the above, the structure is a combustor housing.

In a further embodiment of any of the above, the structure is an exhaust nozzle.

In a further embodiment of any of the above, the insert is constructed from a ceramic material.

In another exemplary embodiment, a method of manufacturing a ceramic panel assembly includes the steps of forming a ceramic liner with a slot, installing an insert into the slot, and securing the ceramic liner to a structure using a fastening assembly.

In a further embodiment of any of the above, the forming and installing steps are performed simultaneously. The slot is formed by arranging layers of CMC around the insert.

In a further embodiment of any of the above, the installing step includes aligning a female fastening element in the insert with a hole in the ceramic liner.

In a further embodiment of any of the above, the installing step includes sliding the insert into the slot.

In a further embodiment of any of the above, the securing step includes threading a male fastening element through a hole in the ceramic liner into the insert. The ceramic liner circumscribes the male fastening element.

In a further embodiment of any of the above, the securing step includes arranging a rib in the ceramic liner with a corresponding corrugation in the structure.

In a further embodiment of any of the above, the structure is an exhaust nozzle.

In a further embodiment of any of the above, the structure is a combustor housing.

BRIEF DESCRIPTION OF THE DRAWINGS

The disclosure can be further understood by reference to the following detailed description when considered in connection with the accompanying drawings wherein:

FIG. 2A is a perspective view of an example ceramic panel assembly.

FIG. 2B is a perspective view of a portion of a ceramic panel shown in FIG. 2A.

FIG. 3 is a schematic view of a ceramic panel assembly used for an exhaust nozzle.

FIG. 4 is a schematic view of a ceramic panel assembly used in a combustor.

DETAILED DESCRIPTION

Figure 1:
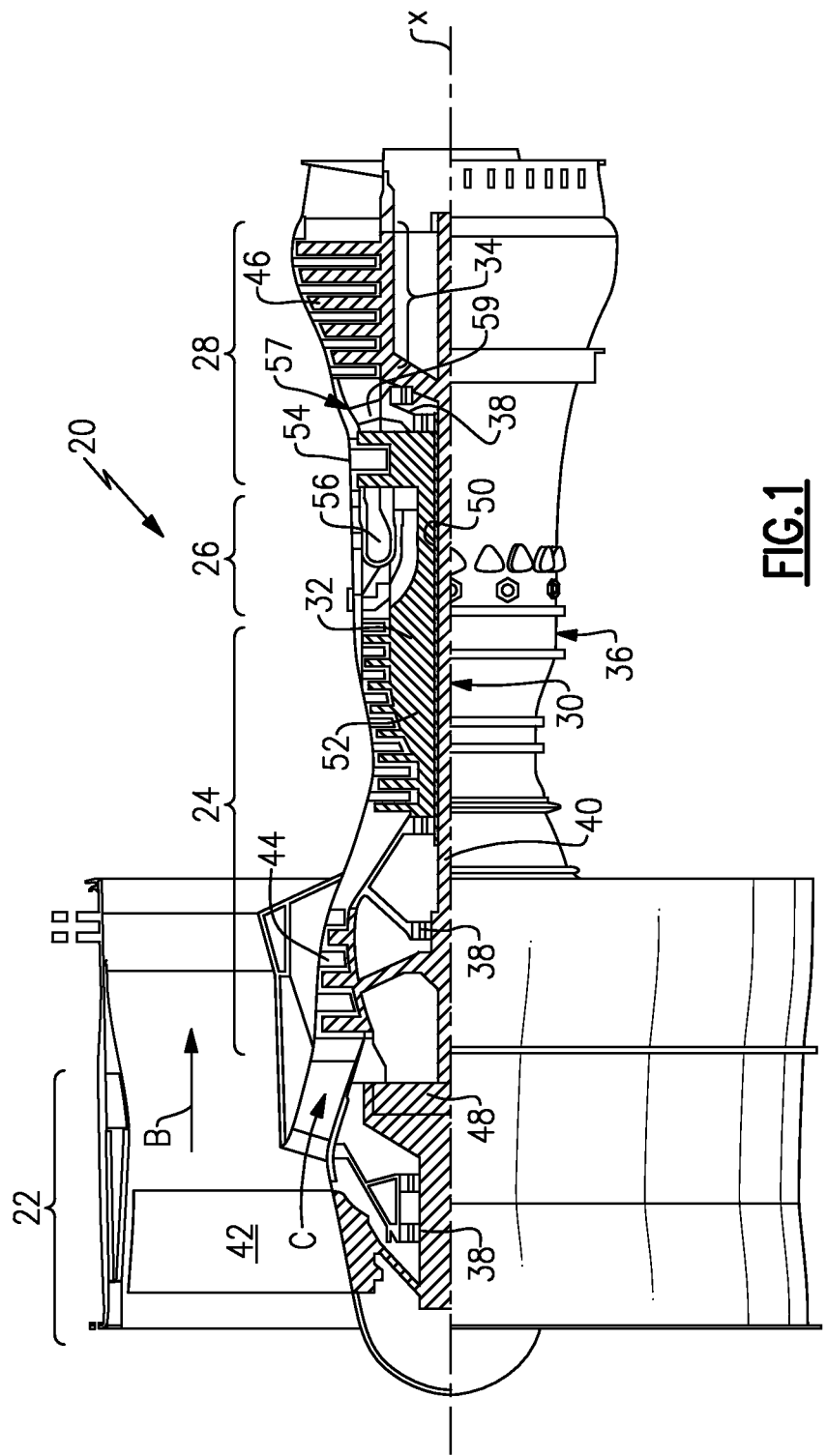
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } ° R)/(518.7° R)]^{0.5}$. The "Low corrected fan tip speed", as disclosed herein according to one non-limiting embodiment, is less than about 1150 ft/second.

A ceramic panel assembly is shown in FIG. 2A. The assembly includes a ceramic liner 60 secured to an adjoining structure 62 by a fastening assembly 64. In the example, the ceramic liner 60 is constructed from a ceramic matrix composite (CMC) constructed from multiple plies, for example. The structure 62 is constructed from a metallic material, which has a different rate of thermal expansion than the ceramic liner 60.

The ceramic panel assembly may be used in a variety of gas turbine engine applications, such as an exhaust nozzle 68 (shown in FIG. 3) and the combustor 56 (shown in FIG. 4). Referring to the exhaust nozzle 68 in FIG. 3, the ceramic liner 160 is exposed to the core flow C within an exhaust gas flow path. The ceramic liner 160 is secured to the adjoining structure 162 by the fastening assembly 164. A cooling flow F is provided on the structure side of the ceramic panel assembly.

Referring to FIG. 4, the combustor 56 includes the ceramic liner 260 secured to an interior of the adjoining structure 262, which provides the combustor housing, by the fastening assembly 264.

Figure 5A:
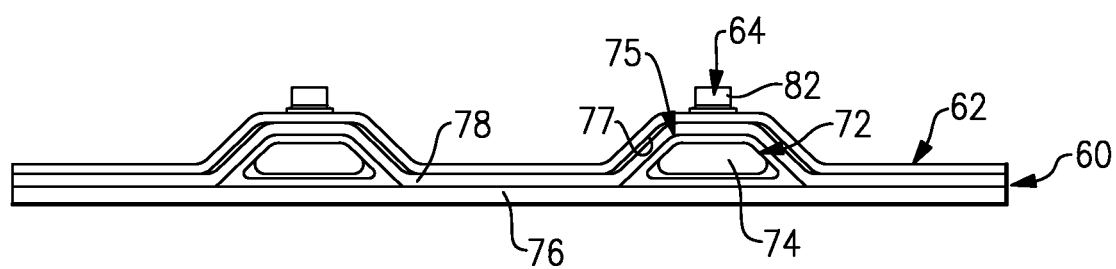
FIG. 5A is an end view of the ceramic panel assembly shown in FIG. 2A.

Referring to FIGS. 2B and 5A, first and second ceramic plies 76, 78, for example, are adhered to one another to provide a slot 72, which is elongated. The first ply 76 is arranged on the hot side of the ceramic panel assembly, and the second ply 78 is arranged on the cold side of the ceramic panel assembly adjacent to the structure 62. In one example, the first ply 76 is generally planar, although other shapes, such as arcuate, may be used. The second ply 78 provides an elongated rib 75 which is of a complementary shape to the slot 72. A correspondingly shaped corrugation 77 is provided in the structure 62 to receive the rib 75 and locate the ceramic liner 60 with respect to the structure 62. The ceramic liner 60 may be constructed from a single layer, two layers, or more than two layers.

An insert 74 is slidably received within the slot 72 subsequent to forming the ceramic liner 60. An opening 84 in the end of the ceramic liner 60 enables the insert 74 to be installed into the slot 72 from an end of the panel. The insert 74 may also be integrated into the ceramic liner during forming, if desired. In one example, the insert is constructed from a ceramic material, such as CMC.

Figure 5B:
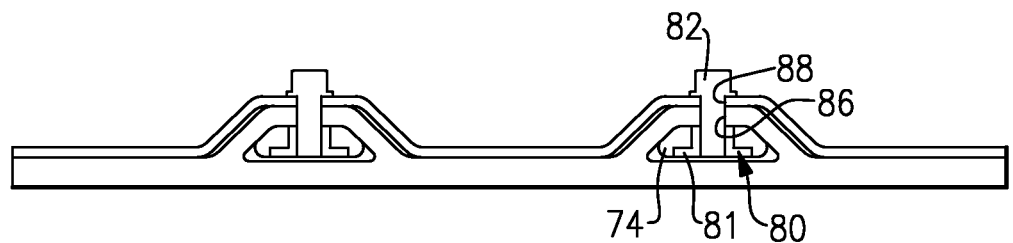
FIG. 5B is a cross-sectional view of the ceramic panel assembly shown in FIG. 2A taken along line 5B-5B.
Figure 5C:
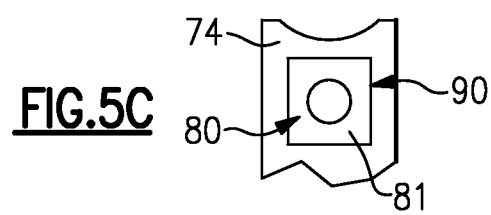
FIG. 5C is a bottom view of an insert used in the ceramic panel assembly shown in FIG. 5B.

As best shown in FIG. 2B, the slot 72 is surrounded along its length by the ceramic material. A first hole 86 for accommodating the fastening assembly 64 is provided in the ceramic liner 60 and is circumscribed by the ceramic material, which provides a stronger structure as compared to a slot shaped opening. Referring to FIG. 5B, a female fastening element 80, such as a bushing, is provided in the insert 74. The female fastening element 80 is aligned with the first hole 86 with the insert 74 arranged in the slot 72. A second hole 88 is provided in the structure. A male fastening element 82, such as a bolt, is received in the first and second holes 86, 88 and threadingly engages the female fastening element 80 to secure the ceramic liner 60 to the structure 62.

The first and second holes 86, 88 are sufficiently enlarged with respect to the outer diameter of the male fastening element 82 to permit relative movement of the ceramic liner 60 with respect to the structure 62 during engine operation and large temperature differentials between these components.

In one example, the female fastening element 80 is provided by a threaded bushing that includes an enlarged base 81. A non-circular shape of the base 81 and a correspondingly shaped aperture in the insert 74 provides an anti-rotation feature 90 that prevents the female fastening element 80 from turning as the male fastening element 82 is tightened during assembly of the ceramic panel assembly.

Figure 6:
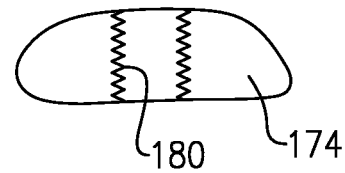
FIG. 6 is a schematic cross-sectional view of another example insert.

Referring to FIG. 6, an insert 174 may be provided using a more structural material, such as metal, so that the female fastening element 180 may be integrated into the insert 174, such as providing a threaded hole in the insert 174.

The ceramic liner 60 is formed by stacking plies, which surround the slot 72 to increase the strength of the ceramic liner 60. No metal is exposed to the core flow gases, which enables the ceramic to protect the metal. The surrounded slot is less susceptible to breaking from vibratory and pressure loads on the ceramic liner.

In one example, a method of manufacturing a ceramic panel assembly includes forming the ceramic liner 60 with the slot 72, installing the insert 74 into the slot 72, and securing the ceramic liner 60 to the structure 62 using the fastening assembly 64. The forming and installing steps are performed simultaneously in one example, and the slot 72 is formed by arranging layers, for example, first and second plies 76, 78 of CMC around the insert 74. In another example, the installing step includes sliding the insert 74 into the slot 72.

The installing step includes aligning the female fastening element 80 in the insert 74 with the hole 86 in the ceramic liner 60. The securing step includes threading a male fastening element 82 through the hole 86 in the ceramic liner 60 into the insert 74 such that the ceramic liner 60 circumscribes the male fastening element 82. The securing step includes arranging a rib 75 in the ceramic liner 60 with a corresponding corrugation 77 in the structure 62.

Although example embodiments have been disclosed, a worker of ordinary skill in this art would recognize that certain modifications would come within the scope of the claims. For that and other reasons, the following claims should be studied to determine their true scope and content.

What is claimed is:

1. A gas turbine engine ceramic panel assembly comprising:
   a combustor housing;
   a ceramic liner having a slot and including a hole, wherein the ceramic liner is provided by laminated ceramic matrix composite (CMC) layers, the laminated CMC layers arranged about the slot;
   an insert is received in the slot and wherein a threaded bushing is secured to the insert to provide a female fastener in the slot aligned with the hole;
   an anti-rotation feature is provided between and prevents relative rotation between the threaded bushing and the insert; and
   a male fastener securing the ceramic liner to the combustor housing.

2. The gas turbine engine ceramic panel assembly according to claim 1, wherein the insert is a metallic material.

3. The gas turbine engine ceramic panel assembly according to claim 1, wherein the insert is slidably received within the slot.

4. The gas turbine engine ceramic panel assembly according to claim 1, wherein the slot forms a rib in the ceramic liner.

5. The gas turbine engine ceramic panel assembly according to claim 1, wherein the ceramic liner circumscribing the male fastener.

6. The gas turbine engine ceramic panel assembly according to claim 1, wherein the insert is constructed from a ceramic material.

7. A gas turbine engine ceramic panel assembly comprising:
   a combustor housing;
   a ceramic liner having a slot and including a hole, wherein the ceramic liner is provided by laminated CMC layers, the laminated CMC layers arranged about the slot;
   an insert is received in the slot and wherein threaded bushing is secured to and slidingly received within the insert to provide a female fastener in the slot aligned with the hole, the threaded bushing being structurally distinct from the insert; and
   a male fastener securing the ceramic liner to the combustor housing.

8. The gas turbine engine ceramic panel assembly according to claim 7, wherein the insert is a metallic material.

9. The gas turbine engine ceramic panel assembly according to claim 7, wherein the insert is slidably received within the slot.

10. The gas turbine engine ceramic panel assembly according to claim 7, wherein the slot forms a rib in the ceramic liner.

11. The gas turbine engine ceramic panel assembly according to claim 7, wherein the ceramic liner circumscribing the male fastener.

\* \* \* \* \*